United States Patent [19]
Rasmussen

[11] Patent Number: 5,469,879
[45] Date of Patent: Nov. 28, 1995

[54] CONDENSATE TRAP AND DRAIN FOR SYSTEMS UNDER PRESSURE

[76] Inventor: John Rasmussen, 8433 South Ave., Youngstown, Ohio 44514

[21] Appl. No.: 247,879

[22] Filed: May 23, 1994

[51] Int. Cl.⁶ ............................................ F16T 1/20
[52] U.S. Cl. .................. 137/187; 137/392; 137/558
[58] Field of Search ........................... 137/187, 392, 137/396, 558

[56] References Cited

U.S. PATENT DOCUMENTS

| | | |
|---|---|---|
| 1,681,344 | 8/1928 | Bell-Irving et al. . |
| 2,564,873 | 8/1951 | Wright . |
| 2,871,874 | 2/1959 | Coles et al. ........................... 137/392 |
| 3,580,158 | 5/1971 | Scholle .............................. 137/392 X |
| 3,675,673 | 7/1972 | Nilges . |
| 3,905,385 | 9/1975 | Green ................................... 137/187 |
| 4,261,382 | 4/1981 | Bridges . |
| 4,308,889 | 1/1982 | Lin et al. . |
| 4,336,821 | 6/1982 | Frantz et al. . |
| 4,483,463 | 11/1984 | Buschmann ....................... 137/392 X |
| 4,530,372 | 7/1985 | Overton et al. ...................... 137/392 |
| 4,809,129 | 2/1989 | Hansen et al. ..................... 137/392 X |
| 4,974,626 | 12/1990 | Koch . |

*Primary Examiner*—Stephen M. Hepperle
*Attorney, Agent, or Firm*—Harpman & Harpman

[57] ABSTRACT

A condensate removal device for capturing, measuring and removing condensate from a fluid system having air or gas under pressure. The device purges only condensate on demand without loss of relative pressure inherent within the system. A single sensing probe extends into a condensate collection reservoir sensing the low and high level of condensate activating a diaphragm type discharge value venting condensate from the reservoir. Once condensate levels fall below a pre-determined level within the reservoir the value is closed awaiting accumulation of additional condensate before cycling again.

6 Claims, 3 Drawing Sheets

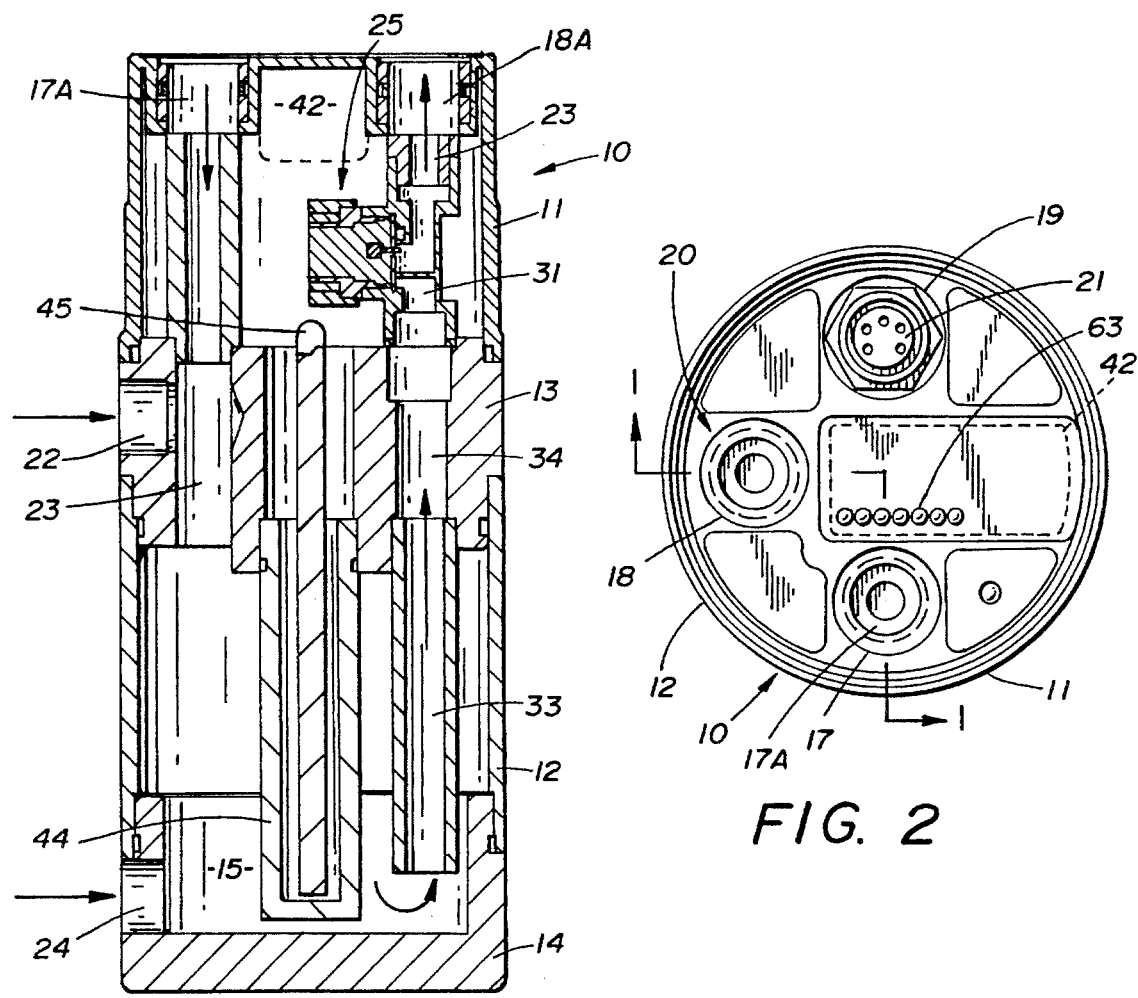
FIG. 1
FIG. 2
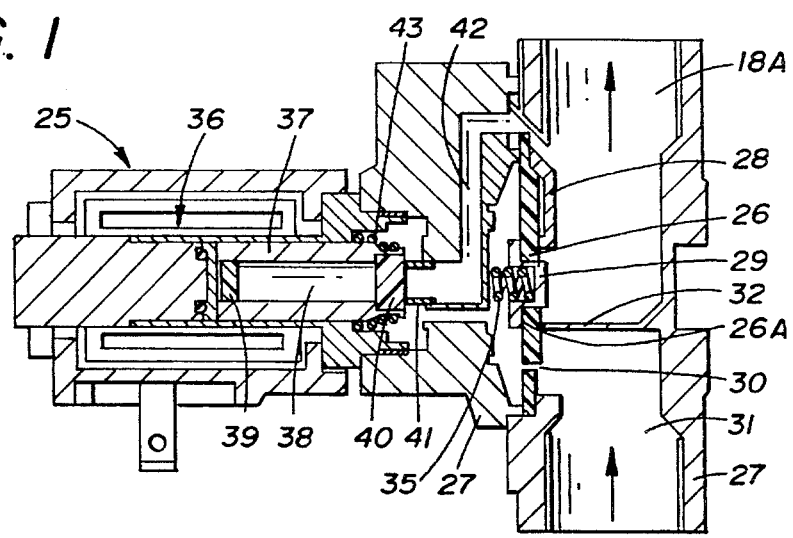
FIG. 3

CONDENSATE TRAP AND DRAIN FOR SYSTEMS UNDER PRESSURE

BACKGROUND OF THE INVENTION

1. Technical Field

This device relates to automatic discharge valves used in condensate traps associated with fluid pressurized systems. It is required to drain accumulated condensate from the traps so that the system will remain free of intrained moisture that persist during compression and expansion of gases under pressure.

2. Description of Prior Art

Prior art devices of this type have been known as float controlled condensate traps which increases the possibility of valve sticking which allows loss of gas or air under pressure within the system. Prior art devices have also utilized timer activated purge valves which can become independent from actual condensate levels within the traps again allowing for an unwanted loss of pressure. Sensing systems have been developed that rely on two condensate sensors with a trap to indicate low and high condensate levels within. Single sensor probes have also been illustrated that contain two sensing elements in a single probe body allowing for reliable selective activation and auditing of the purge valve by separate sensing elements within, see for example U.S. Pat. Nos. 1,681,344, 2,564,873, 3,675,673, 4,261,382, 4,308,889, 4,336,821 and 4,974,626.

In U.S. Pat. No. 1,681,344 a condensate removing system is shown wherein an auxiliary condensate discharge pipe and discharge valve utilizes a differential of pressure between supply header and discharge header requiring an unbalance of air pressure for condensate to be purged from the system.

U.S. Pat. No. 2,564,873 utilizes an automatic electromagnetic drain valve to remove condensate from a gas pressurized system. Exposed terminals are positioned within a condensate gathering chamber within the valve. Once the terminals are submerged by the rising level of condensate, a switch is formed thereby activating a solenoid controlled valve. An additional feature of the device is indicated by utilization of the heat which occurs in the terminal ends during current flow for melting ice that may accumulate within the condensate.

U.S. Pat. No. 3,675,673 is directed to a pressure activated drain valve responsive to differential and fluid viscosity i.e. air and water.

In U.S. Pat. No. 4,261,382 a condensate drain valve is disclosed wherein single and multiple sensors are positioned within fluid transfer system to activate an electronic circuit for drain valve operation. Once a probe is covered with condensate, a positive output is achieved to an integrated circuit that compares same with an inherent value within the circuit opening the main valve within a timing event circuit.

U.S. Pat. No. 4,308,889 is directed to an electric conductive type steam trap having a condensate level detecting apparatus connected to a control circuit that activates a solenoid valve discharging the condensate. The valve activation is timed for closing after a pre-determined time element has expired after the condensate detecting probe is free of condensate. The probe is a simple on/off signal activation device.

U.S. Pat. No. 4,336,821 discloses a solenoid activated drain valve in which the valve element is a differential piston exposed on opposite faces to reservoir pressure normally holding the valve closed and minimizing the opening force required to be exerted by the solenoid. A temperature responsive heating element protects the valve from freezing while a sensing element determines the presence of water allowing the valve to operate.

Finally, in U.S. Pat. No. 4,974,626 a condensate trap valve is shown utilizing two sensors positioned in vertically spaced relation to one another in a single tube within a condensate accumulation chamber. As the first sensor is submerged in condensate a signal is formed indicating low level and it is the differential in contact between the two sensors which determine an activation of the condensate trap valve within the system.

SUMMARY OF THE INVENTION

A condensate removal device that selectively and progressively senses the presence and relative amount of condensate accumulating within a condensate reservoir. A single sensing probe element that responds to gradual increases in accumulated condensate activates a control circuit that determines preset condition levels and opens a purge valve eliminating condensate from the system. Decreasing condensate contact on the sensing probe defines a purge cycle completion and thus deactivates the valve. Secondary purge and valve activation is achieved at low condensate level without required high condensate level to assure the purging of sediment build-up without pressure loss within the system.

DESCRIPTION OF THE DRAWINGS

FIG. 1 is a cross-sectional view on lines 1—1 of FIG. 2;

FIG. 2 is a top plan view of the condensate drain valve construction;

FIG. 3 is an enlarged cross-section of a condensate purge valve within the system;

DESCRIPTION OF THE PREFERRED EMBODIMENT

Figure 4:
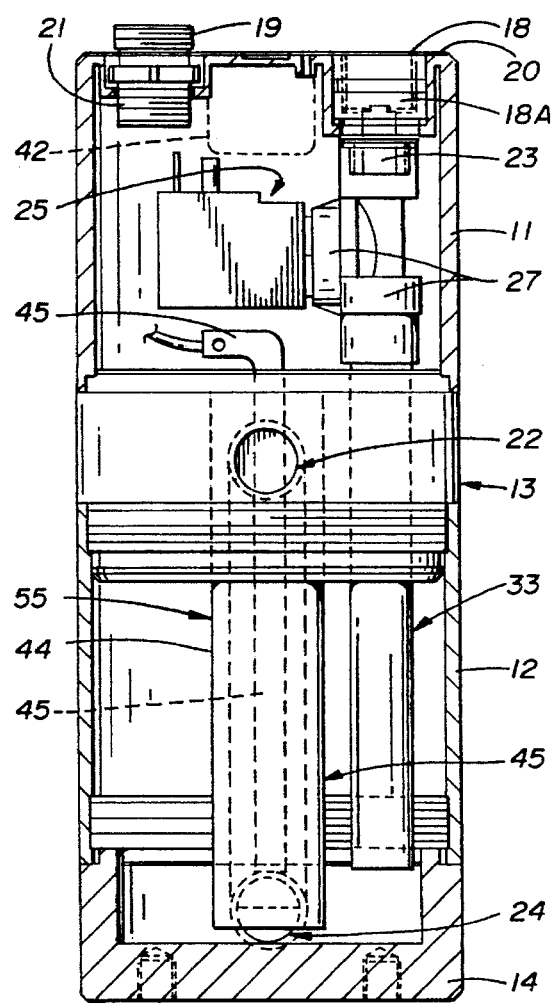
FIG. 4 is a cross-sectional view of the condensate drain valve construction.

Referring to FIGS. 1–4 of the drawings, a condensate trap and drain valve 10 can be seen having an upper main cylinder housing 11 and a lower main cylinder housing 12. A threaded top cap 13 is positioned between said respective housings with a bottom cap 14 threadably secured to the lower main cylinder housing 12 defining a condensate reservoir 15 within. The upper main cylinder housing 11 has multiple apertures at 17, 18, and 19 formed within a recessed end portion 20. Said apertures 17 and 18 are connector fittings defining a condensate inlet port 17A and a purge outlet port 18A respectively. A multiple pin electronic connector fitting 21 is threadably secured within said remaining aperture at 19. A secondary condensate inlet port 22 is positioned in the top cap 13 and is interconnected with said inlet port 17A via an internal passageway 23 best seen in FIG. 1 of the drawings. A third condensate inlet port 24 is provided within the bottom cap 14 in direct communication with the condensate reservoir 15 and said hereinbefore described inlet ports 17A and 22.

The purge outlet port 18A is in communication with a solenoid valve assembly 25, best seen in FIGS. 1 and 3 of the drawings. The solenoid valve assembly 25 is comprised of a flexible diaphragm 26 which is secured around its perimeter between a valve housing 27 and a purge port housing 28. The diaphragm 26 has a centrally located spring seat fitting 29 and is apertured at 30 adjacent said seat fitting which defines a communication passageway with a lower purge outlet housing passageway 31 defined by a partition 32 within. The lower purge outlet housing passageway 31 extends downwardly from the partition 32 to a discharge pipe 33 via an interconnecting bore 34 within the top cap 13 between the hereinbefore described main cylinder housings 11 and 12. The discharge pipe 33 extends from the top cap 13 into the condensate reservoir 15, best seen in FIG. 4 of the drawings.

A coil spring 35 extends from the spring seat fitting 29 and abuts against the inner portion of the valve housing 28 which defines a fluid passageway on one side of the diaphragm 26. The spring 35 urges the diaphragm 26 against a valve seat 26A formed by a valve port within the housing 27 just above the partition 32 as will be well understood by those skilled in the art.

It will thus be evident from the above description that to lift the spring seat fitting 29 on the associated diaphragm 26, the force of the spring 35 must be overcome. In operation, atmospheric pressure is present within the purge outlet port 18A above the partition 32 whereas in the condensate chamber 15 and the lower purge outlet housing passageway 31 above atmospheric pressure is maintained by the system during operation.

Referring back to FIG. 3 of the drawings, a solenoid 36 can be seen having a coil 37 and a plunger 38 which is mounted in the valve housing 27. The plunger 38 has a top valve gasket 39 and a bottom valve gasket 40 which engages against a valve seat 41 in a pilot orifice passageway 42 that is in communication with the purge outlet port 18A. A spring 43 is engaged about the plunger 38 urging the bottom valve gasket 40 against the hereinbefore disclosed valve seat 41.

Figure 5:
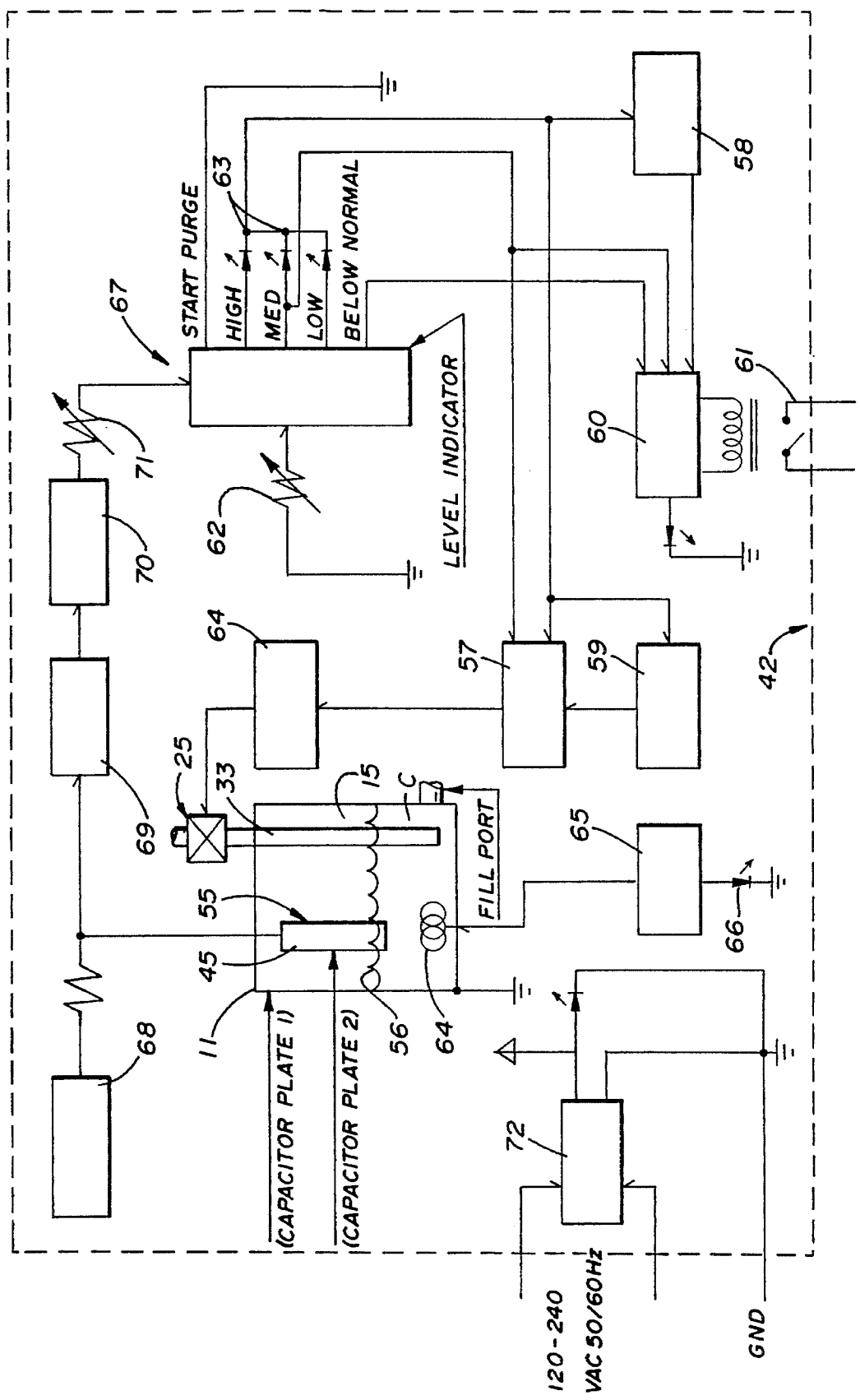
FIG. 5 is a functional block flow diagram of a control circuit associated with the condensate drain valve.

Referring to FIG. 5 of the drawings, an electronic control unit 42 shown in broken lines is positioned within the upper portion of the housing 11 adjacent the solenoid valve assembly 25 hereinbefore described. A sensor tube 44 projects vertically downwardly from the threaded top cap 13 into the condensate reservoir 15 adjacent the bottom cap 14. The sensor tube 44 is preferably made of a non-conductive synthetic resin material.

A metal probe 45 is embedded within the sensor tube 44. The metal probe 45 functions as one plate of a variable capacitor 55 with the enclosure of the condensate reservoir 15 defined by the cylinder housing 12 acting at the other plate of the variable capacitor 55.

In this application as the condensate C (water) level rises and falls within the condensate reservoir 15 the dielectric properties of the variable capacitor 55 formed by the hereinbefore described cylinder housing 12 and probe 45 change, therefore changing the inherent impedance in the variable capacitor 55 which is detected and processed by the control unit 42.

Referring to FIG. 5 of the drawings, a functional block diagram of the condensate trap and drain device of the invention is illustrated wherein the various components are shown in a control flow diagram path. The probe 45 within the sensor tube 43 is positioned within the condensate reservoir 15 with a condensate level at 56 indicated. The control unit 42's circuit components are illustrated by functional blocks including purge logic block 57, a purge timer 58, an overall system timer 59. An alarm logic circuit block 60 provides an alarm output at 61 which indicates abnormal, no function condition within the hereinbefore described system.

Figure 6:
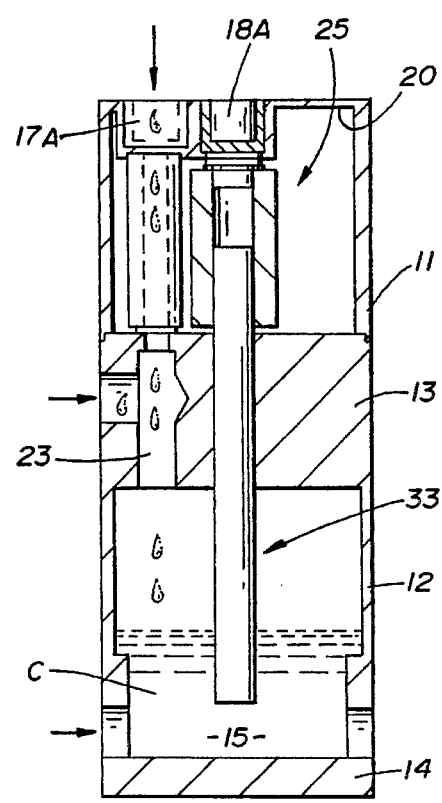
FIG. 6 is a graphic illustration of low condensate level within the valve system.
Figure 7:
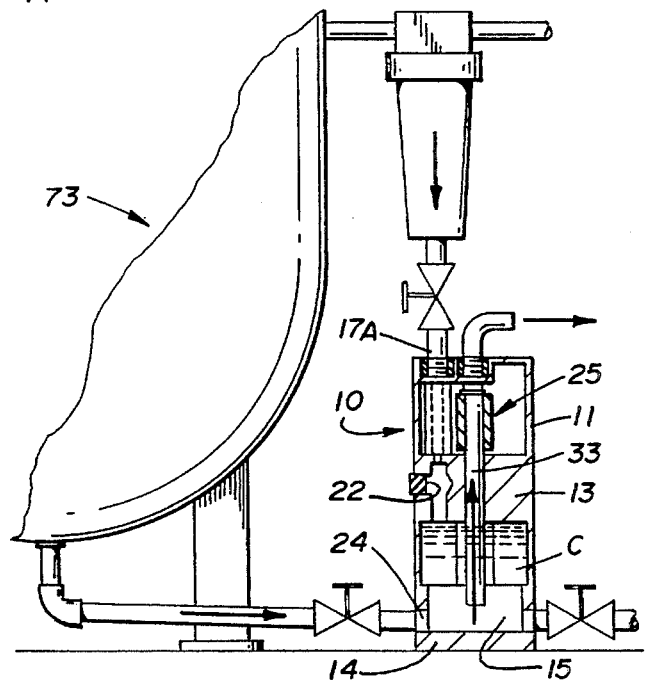
FIG. 7 is a graphic illustration of a high condensate level within the valve system installed on a fluid pressure system.

In operation, as the condensate level reaches the predetermined level in the condensate reservoir 15 as set by a trip point adjustment 62 the dielectric properties of the variable capacitor 55 change inducing a low, medium and high condensate level as indicated on level indicator diodes 63 in the control unit 42. Once a high condensate level is reached a purge state is indicated and induced in the system. The solenoid valve assembly 25 is activated by a solenoid driver 64 energizing the solenoid coil 37 drawing the plunger 38 away from the valve seat 41 allowing condensate in the condensate reservoir 15 under the pressure of the system to exit through the purge outlet port 18A as illustrated in FIG. 7 of the drawings. As the purge of condensate continues and the condensate level drops within the condensate reservoir 15, a low level is sensed by the variable capacitor 55 defined by the cylinder housing 12 and probe 45 and indicated by the level indicator light emitting diodes 63, the purge cycle ends as illustrated in FIG. 6 of the drawings and the solenoid valve 25 is closed. The condensate level status is thus monitored by the system with the alarm logic circuit block 60 and alarm output at 61 being activated within the control unit to indicate lack of valve opening or unusual high or low levels of condensate within the condensate reservoir 15. The timer control circuits 58 and 59 are provided to oversee and extend purge valve cycles if necessary.

It will be evident from the above description that closed lube condensate removal is achieved that purges only on demand avoiding the loss of air pressure in a typical air pressurized system 73 on which it is installed as illustrated in FIG. 7.

Referring back to FIG. 5 of the drawings, the functional block diagram of the system of the invention, it will be seen that a optional heating coil 64 is provided within the condensate reservoir 15 having a heater control block 65 and a heat indicator at 66. The electrical output from the sensor tube and enclosed probe 45 is detected and treated by a sensing circuit 67 having an oscillator 68, amp 69, level detection 70 and sensitivity adjustment 71 as will be well known and understood by those skilled in the art.

A power source 72 for the control unit 42 is provided.

Thus it will be seen that, a new and novel condensate trap and drain for systems under pressure has been illustrated and described and it will be apparent to those skilled in the art that various changes and modifications may be made therein without departing from the spirit of the invention, therefore I claim:

1. A condensate trap and drain system for use with systems under pressure comprises, an upper cylinder housing and a lower cylinder housing, a top cap threadably secured therebetween, a bottom cap threadably secured to said lower cylinder housing, a condensate collection reservoir therebetween, means for connecting said reservoir to said system, a purge outlet from said reservoir, a purge valve normally closing said purge outlet, sensing means within said collection reservoir in said lower cylinder housing comprising, a sensor tube projecting into said collection reservoir, a single probe encased within said sensor tube, said probe and said lower cylinder housing defining a variable capacitor within said condensate collection reservoir, said variable capacitor being responsive to changes in level of liquid condensate within said chamber, a control unit integrated into said upper cylinder housing said control unit comprising a sensing surrogate indicating level of condensation within said condensing reservoir by changes in impediment of said variable capacitor within, a purge valve in communication with said condensate reservoir, means for connecting said sensing means with said purge valve whereby opening and closing said purge valve responsive to condensate level changes within said condensate reservoir.

2. The condensate trap and drain device of claim 1 wherein said purge valve comprises a diaphragm valve control by a pilot valve in communication with said sensing means, means for permanent communication between a lower purge outlet housing passageway and said pilot valve.

3. The condensate trap and drain set forth in claim 1 wherein said condensate reservoir is formed within the lower cylinder housing between said top cap and said bottom cap.

4. The condensate trap set forth in claim 2 wherein said diaphragm valve includes a spring, a spring seat fitted on said diaphragm, said spring urging said diaphragm valve to its closed position.

5. The condensate trap and drain of claim 1 wherein said cylinder housings have multiple condensate inlets in communication with said condensate reservoir, and selective valve means on said inlets.

6. The condensate trap and drain set forth in claim 1 wherein said control unit further comprises an alarm logic circuit, a level indicator light circuit, a heater control circuit and timing circuits interconnected to said solenoid valves, said circuits being located in said upper cylindrical housing.

* * * * *